(12) United States Patent
Bali et al.

(10) Patent No.: US 8,666,429 B1
(45) Date of Patent: Mar. 4, 2014

(54) LOCATION SIGNATURE EXTRACTION ON A WIRELESS COMMUNICATION NETWORK

(75) Inventors: Soshant Bali, San Mateo, CA (US);
Mark Evans, San Mateo, CA (US);
Phyllis J. Reuther, Woodside, CA (US);
Kosol Jintaseranee, San Jose, CA (US);
Heesook Choi, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 152 days.

(21) Appl. No.: 13/194,603

(22) Filed: Jul. 29, 2011

(51) Int. Cl.
*H04W 24/00* (2009.01)

(52) U.S. Cl.
USPC .................. 455/456.1; 455/456.3; 455/456.6; 701/213; 701/455

(58) Field of Classification Search
USPC ................. 455/456.1, 456.3, 456.6; 709/222; 707/769; 715/765; 701/213, 455
See application file for complete search history.

(56) References Cited

U.S. PATENT DOCUMENTS

| | | | |
|---|---|---|---|
| 7,274,332 | B1 | 9/2007 | Dupray |
| 7,714,778 | B2 | 5/2010 | Dupray |
| 7,764,231 | B1 | 7/2010 | Karr et al. |
| 2001/0022558 | A1 | 9/2001 | Karr et al. |
| 2003/0146871 | A1 | 8/2003 | Karr et al. |
| 2003/0222820 | A1 | 12/2003 | Karr et al. |
| 2004/0198386 | A1 | 10/2004 | Dupray |
| 2007/0287473 | A1 | 12/2007 | Dupray |
| 2008/0133126 | A1 | 6/2008 | Dupray |
| 2009/0254975 | A1 | 10/2009 | Turnbull et al. |
| 2010/0279706 | A1* | 11/2010 | Dicke ........................ 455/456.1 |
| 2010/0279710 | A1* | 11/2010 | Dicke et al. ................ 455/456.3 |
| 2011/0022313 | A1* | 1/2011 | Bugnariu ..................... 701/213 |
| 2012/0003988 | A1* | 1/2012 | Leica et al. ................ 455/456.1 |
| 2012/0079086 | A1* | 3/2012 | Miettinen ..................... 709/222 |
| 2012/0284297 | A1* | 11/2012 | Aguera-Arcas et al. ...... 707/769 |
| 2012/0316782 | A1* | 12/2012 | Sartipi et al. .................. 701/455 |
| 2013/0014040 | A1* | 1/2013 | Jagannathan et al. ........ 715/765 |
| 2013/0053074 | A1* | 2/2013 | Sanchez et al. ............ 455/456.6 |

* cited by examiner

*Primary Examiner* — David Q Nguyen

(57) ABSTRACT

Embodiments disclosed herein provide systems and methods for extracting location signatures from data received from mobile devices on a wireless communication network. In a particular embodiment, a method provides, upon determining a location of a wireless communication device, receiving data generated by an application executing on the wireless communication device and using the location to determine whether the data contains information pertaining to the location of the wireless communication device. If the data contains the information pertaining to the location of the wireless communication device, the method provides identifying a location signature specific to the application and using the location signature to determine whether subsequent data transferred from a plurality of wireless communication devices contains information pertaining to a location of any of the plurality of wireless communication devices.

20 Claims, 6 Drawing Sheets

LOCATION SIGNATURE EXTRACTION ON A WIRELESS COMMUNICATION NETWORK

TECHNICAL BACKGROUND

Many modern wireless devices, such as smart phones, are capable of running software programs that are commonly referred to as applications. These applications may be preloaded onto a wireless device or may be installed via application stores that execute on the device or from a personal computer. Applications may include web browsing applications, social networking applications, audio/video streaming applications, messaging applications, or any other type of application that can function on a wireless device. During their execution, applications may have access to various elements of a wireless device in order to carry out the functionality of the application.

In particular, some applications will have access to location information about the wireless device on which they are executing. For example, an application may be able to access a Global Positioning System (GPS) receiver for the wireless device in order to obtain GPS coordinates. The application can then use this information as part of its functionality either locally on the wireless device or by transferring the location information over a wireless network to a remote system.

The wireless network over which the location information is transferred may have the capability to recognize the location information as the location information passes through the wireless network. The wireless network does so by recognizing an indicator, such as a location signature, within the communications transmitted from connected wireless devices that denotes location information is contained therein. Each application that transfers location information may do so using a different location signature. If the wireless network does not know the location signature for an application, then the location information may pass through the wireless network undetected. The fast rate in which new applications are released for wireless devices increases the likelihood that the wireless network will not recognize location information from a new application that uses an unknown location signature.

Overview

Embodiments disclosed herein provide systems and methods for extracting location signatures from data received from mobile devices on a wireless communication network. In a particular embodiment, a method provides, upon determining a location of a wireless communication device, receiving data generated by an application executing on the wireless communication device and using the location to determine whether the data contains information pertaining to the location of the wireless communication device. If the data contains the information pertaining to the location of the wireless communication device, the method provides identifying a location signature specific to the application and using the location signature to determine whether subsequent data transferred from a plurality of wireless communication devices contains information pertaining to a location of any of the plurality of wireless communication devices.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
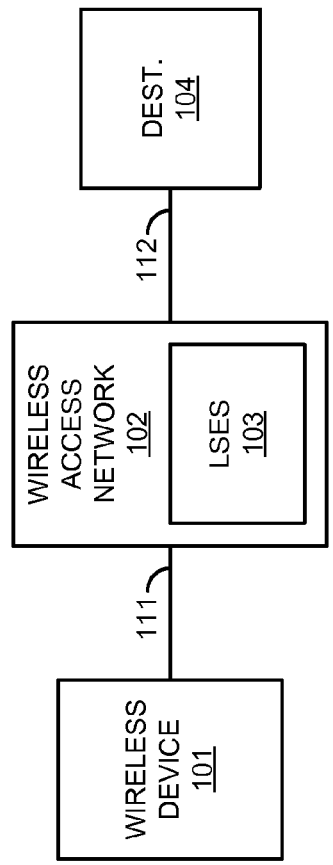
FIG. 1 illustrates a wireless communication system for extracting location signatures from data received from mobile devices on a wireless communication network.

FIG. 1 illustrates wireless communication system 100 for extraction of location signature updates. Wireless communication system 100 includes wireless communication device 101, wireless access network 102, location signature extraction system (LSES) 103, and destination 104. Wireless communication device 101 and wireless access network 102 communicate over wireless link 111. Wireless access network 102 and destination 104 communicate over communication link 112.

In operation, wireless device 101 executes various applications. These applications may include social networking applications, messaging applications, web browsing applications, and operating software for wireless device 101 itself. Many of these applications determine location information for wireless device 101. For example, a social networking application may determine a location of wireless device 101 from a GPS module of wireless device 101 in order to display where a user of wireless device 101 is located when the user posts a status update. In another example, an application running on wireless device 101 may obtain location information for wireless device 101 in order to display advertisements in the application that are relevant to the location of wireless device 101.

In addition, applications on wireless device 101 may transfer location information about the location of wireless device 101 over wireless network 102. For example, as in the two examples from above, destination 104 may be a social network system or an ad server that receives location information from wireless device 101 in order to append the location to a user status update or to provide ads relevant to the location of wireless device 101. Each application that transfers location information for wireless device 101 formats data containing location information into a certain pattern or arrangement before transmittal. This pattern or arrangement may be called a location signature and may be unique to a specific application or may be shared among multiple applications. The location signature may be, for example, a header on the data that indicates that a location is forthcoming or may be the arrangement of the data as a whole.

Wireless access network 102 is able to recognize when location information is being sent from wireless device 101 based on the location signatures in data transferred from wireless device 101. LSES 103 stores known location signatures for applications that may be running on wireless devices connected to wireless network 102. The location signatures stored in LSES 103 can be compared to the data coming form wireless device 101 in order to determine whether the data contains location information for wireless device 101. Upon recognition of location information transferred from wireless device 101, wireless network 102 can perform various actions based on the recognition. For example, wireless network 102 may block location information from being transferred to destination 104 or use the location information itself for providing billing, emergency, or other services to wireless device 101.

Unfortunately, at the rate that new applications can be created, downloaded to wireless device 101, and executed on wireless device 101, the number of new location signatures used by those new applications increases at a similar rate. Consequently, the location information that is transferred from wireless device 101 using these new signatures may not be recognized as it passes through wireless network 102 due to the outdated list of location signatures stored in LSES 103.

Figure 2:
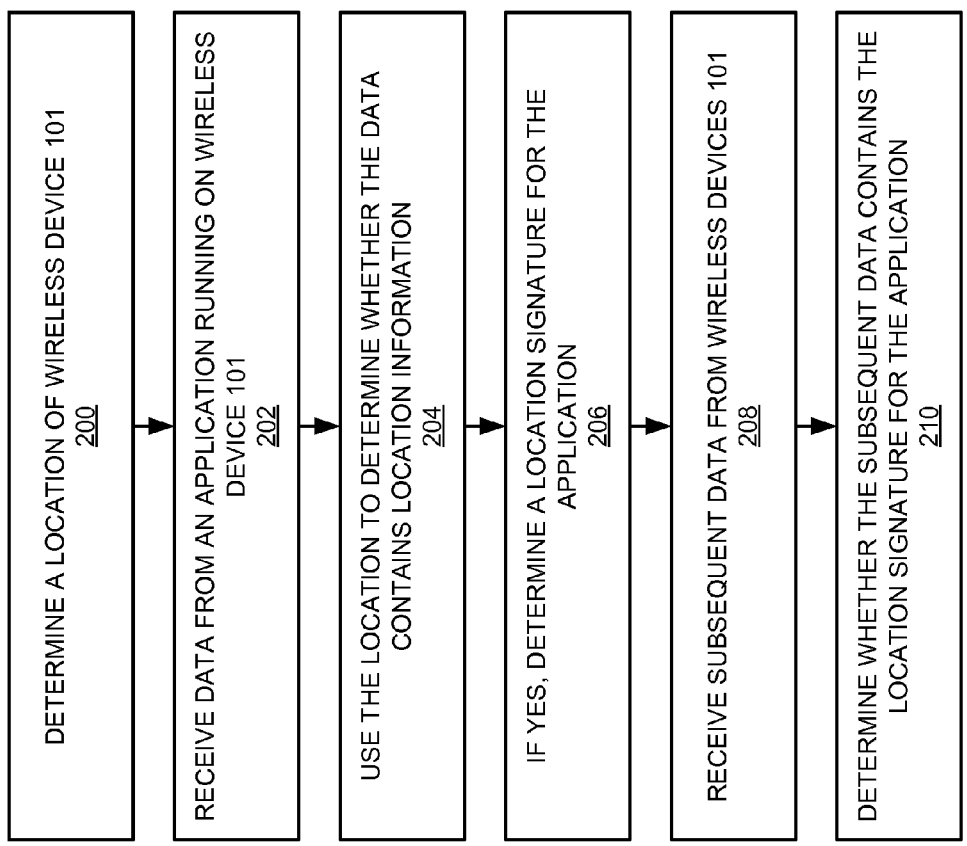
FIG. 2 illustrates the operation of the wireless communication system for extracting location signatures from data received from mobile devices on a wireless communication network.

FIG. 2 illustrates the operation of wireless communication system 100 for extraction of location signature updates. The operation begins with LSES 103 determining a location of wireless device 101 (step 200). The location may vary in precision. For example, the location may be exact geographic coordinates or may be a city, along with other levels precision. The location may be determined by receiving Global Positioning System (GPS) coordinates from wireless device 101, by receiving information about the location of the base station or mobile switching center in wireless network 102 to which wireless device 101 is connected, by recognizing a known location signature in data from wireless device 101 and retrieving the location from the data, or by any other method for determining the location of a wireless device.

After determining the location of wireless device 101, LSES 103 receives data generated by an application executing on wireless device 101 and transferred from wireless device 101 (step 202). The application may be social networking, messaging, mapping, web browsing, audio/video streaming, operating system, or any other type of application capable of running on wireless device 101. In some embodiments, the application may include cloud-based applications, such as web apps, that execute within other applications on wireless device 101. The data may include any data that the application may need to exchange with wireless network 102 or destination 104 in order for the application to function. In particular, the data may include location information about a location of wireless device 101.

LSES 103 then uses the location to determine whether the data contains location information for wireless device 101 (step 204). The data is determined to contain location information for wireless device 101 if the data indicates a location proximate to the location determined in step 200 for wireless device 101. Therefore, the location information does not need to indicate the exact same location as was determined for wireless device 101, but may instead indicate a location reasonably nearby. A location would be reasonably nearby if it would be possible for wireless device 101 to move from the location determined in step 200 to the location indicated by the location information within the amount of time that elapsed between steps 200 and 202. In contrast, LSES 101 will ignore location information that is not proximate to the location determined in step 200 because that location information is most likely not relevant location information for wireless device 101 for the purposes of determining new location signatures.

As with the location determined in step 200, the location information within the data may vary in precision. For example, both the location from step 200 and the location information could be geographic coordinates, both could indicate a city, one could be geographic coordinates while the other is a city, or any other combination of location types for a wireless device.

If the data contains location information, LSES 103 determines a location signature for the application that indicates whether data from the application contains location information for wireless device (step 206). The location signature may be any indicator within the data that denotes that the data contains location information for a wireless device. This indicator may be a header, footer, or some other string within the data that states that the data contains location information. Likewise, the indicator may be the format of the data itself, including a pattern or arrangement of the data, or any other way of identifying that the application that is executing on wireless device 101 has transferred data that includes location information for wireless device 101.

In some embodiments, after determining the location signature for the application, LSES 103 stores the location signature along with other location signatures, if any. LSES 103 may further determine additional information about the application, such as application name and type, and store that information along with the location signature for the application so that it can be ascertained which applications are sending specific sets of location information.

If the data does not contain location information for wireless device 101, then LSES 103 will continue to monitor data transferred from wireless device 101 for location information. In some embodiments, if data containing location information is not received within a period of time, then LSES 103 may start over at step 200 in order to make sure that the location of wireless device 101 stays relevant for the purposes of determining whether data contains location information.

LSES 103 then receives subsequent data from wireless device 101 and other wireless devices on wireless network 102 (step 208) and determines whether the subsequent data contains the location signature for the application (step 210). A comparison is made between the location signature for the application and the subsequent data to determine whether the subsequent data contains location information that originated with the application running on either wireless device 101 or one of the other wireless devices communicating with wireless network 102.

Advantageously, after identifying the previously unknown location signature for the application, LSES 103 can use the location signature to identify location information generated by the application executing on any wireless device connected to wireless network 102. Moreover, LSES 103 can continually ascertain location signatures for new applications that were previously unknown to LSES 103 without having to wait for an location signature update, which may not be comprehensive, to be pushed to LSES 103.

LSES 103 can use this same process to identify location signatures for other applications that execute on wireless devices connected to wireless network 102. Likewise, LSES 103 may perform the process on multiple wireless devices simultaneously in order to identify location signatures for applications that are running on some wireless devices but not others.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access network 102 comprises network elements that provide wireless devices with wireless communication access to packet communication services. Wireless network 102 may comprise switches, wireless access nodes, Internet routers, network gateways, application servers, computer systems, communication links, or some other type of communication equipment—including combinations thereof.

Location signature extraction system (LSES) 103 comprises a computer system and communication interface. LSES 103 may also include other components such a router, server, data storage system, and power supply. LSES 103 may reside in a single device or may be distributed across multiple devices. LSES 103 is shown internally to wireless access network 102, but LSES 103 could be external to the components of wireless access node 102. LSES 103 could be a mobile switching center, network gateway system, Internet access node, service node, or some other communication system—including combinations thereof.

Destination 104 comprises a computer system and communication interface. Destination 104 may also include other components such a router, server, data storage system, and power supply. Destination 104 may reside in a single device or may be distributed across multiple devices. Destination 104 is shown externally to wireless access network 102, but destination 104 could be integrated within the components of wireless access network 102 or some other communication network, such as the Internet. Destination 104 could be a application server or some other type of system that would receive location information from a wireless device.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
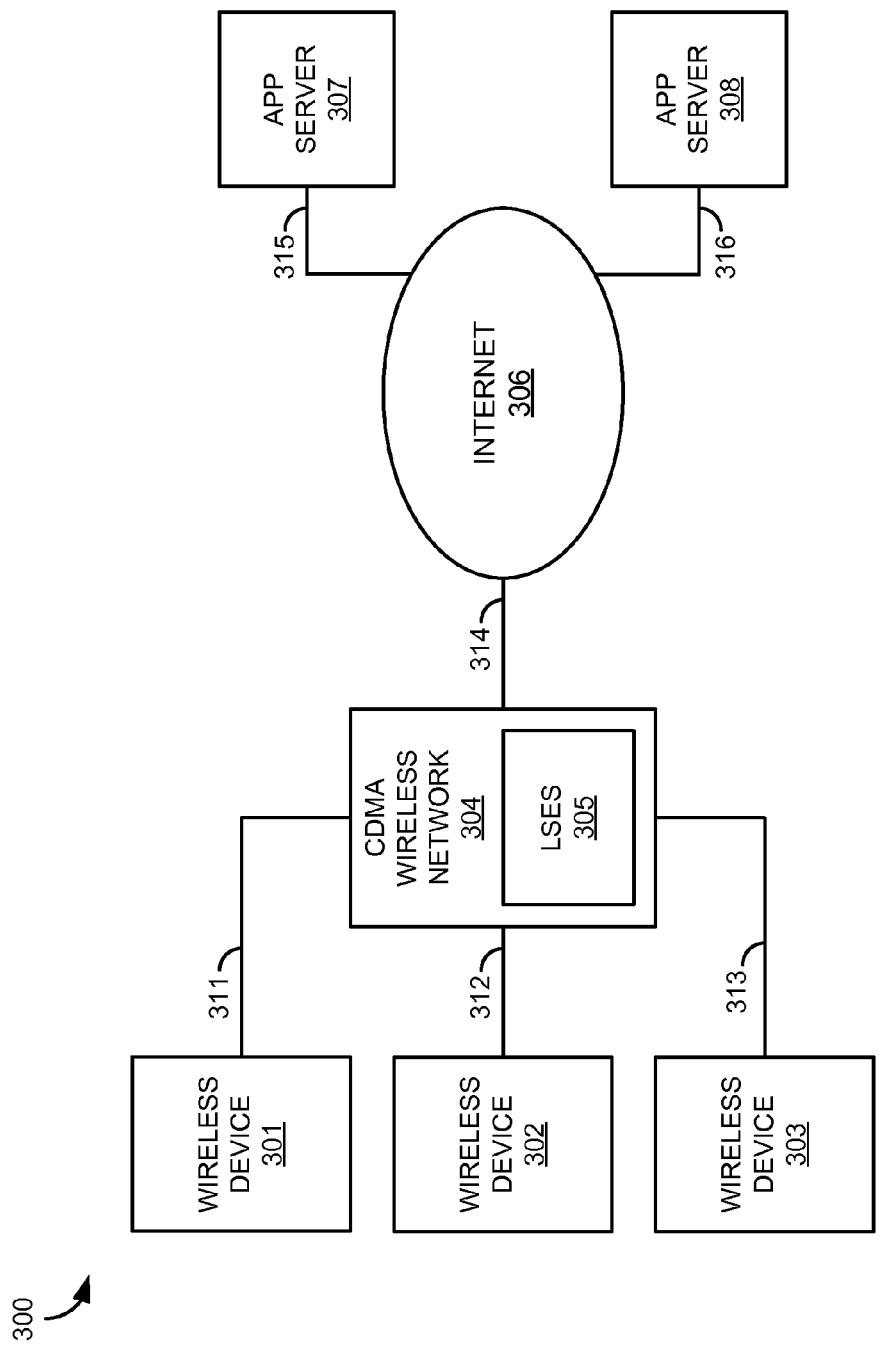
FIG. 3 illustrates a wireless communication system for extracting location signatures from data received from mobile devices on a wireless communication network.

FIG. 3 illustrates wireless communication system 300 for extraction of location signature updates. Wireless communication system 300 includes wireless communication devices 301-303, CDMA wireless network 304, location signature extraction system (LSES) 305, Internet 306, and application servers 307-308. Wireless communication devices 301-303 and CDMA wireless network 304 communicate over wireless links 311-313, respectively. CDMA wireless network 304 and Internet 306 communicate over communication link 314. Internet 306 and application servers 307-308 communicate over communication links 315-316, respectively.

Figure 4:
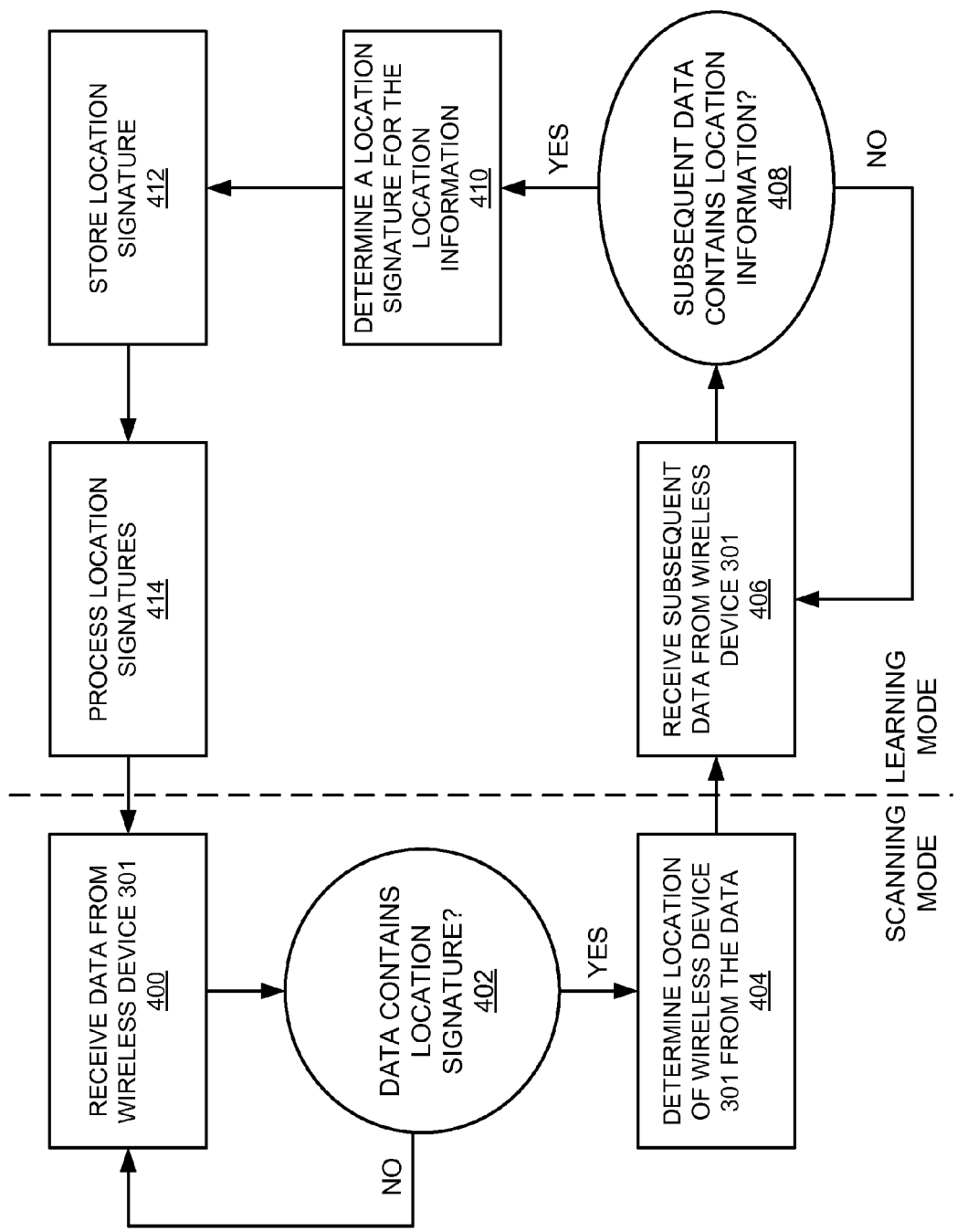
FIG. 4 illustrates the operation of the wireless communication system for extracting location signatures from data received from mobile devices on a wireless communication network.

FIG. 4 illustrates the operation of wireless communication system 100 for extraction of location signature updates. In operation, LSES 305 begins in a scanning mode where LSES 305 scans data received from wireless devices 301-303 for known location signatures. These known location signatures are location signatures for applications that LSES 305 is aware execute or could execute on wireless devices 301-303. The known location signatures may be stored in a database located in LSES 305. While FIG. 4 focuses on the operation of wireless communication system 100 as it relates to wireless device 301, the same operation may be performed with wireless devices 302-303 as well.

The scanning mode begins with LSES 305 receiving data from wireless device 301 (step 400). LSES 305 receives the data by intercepting the data as it passes through CDMA network 304 en route to a destination. The data may be any type of data that an application executing on wireless device 301 may need to transfer as part of the functionality of the application.

The payloads of the packets that comprise the received data are inspected by LSES 305 to determine whether the data contains a known location signature (step 402). The payloads are compared to the know location signatures that are stored in LSES 305. If the payloads do not match a known location signature, then LSES 305 repeats steps 400 and 402 until LSES 305 is able to find a known location signature within data received from wireless device 301.

In this example, a first application executing on wireless device 301 transfers location information for wireless device 301 to application server 307. The location signature that the first application uses to transfer the location information is a known location signature. Therefore, at step 402, LSES 305 recognizes the location signature of the first application.

Once LSES 305 has determined that the received data contains a known location signature, LSES 305 identifies the location information that the data contains, as indicated by the location signature. From the contained location information LSES 305 is able to determine a location for wireless device 301 (step 404). In this example, the location information includes geographic coordinates of wireless device 301. The geographic coordinates of wireless device 301 are shown in FIG. 5 as Location 1.

Figure 5:
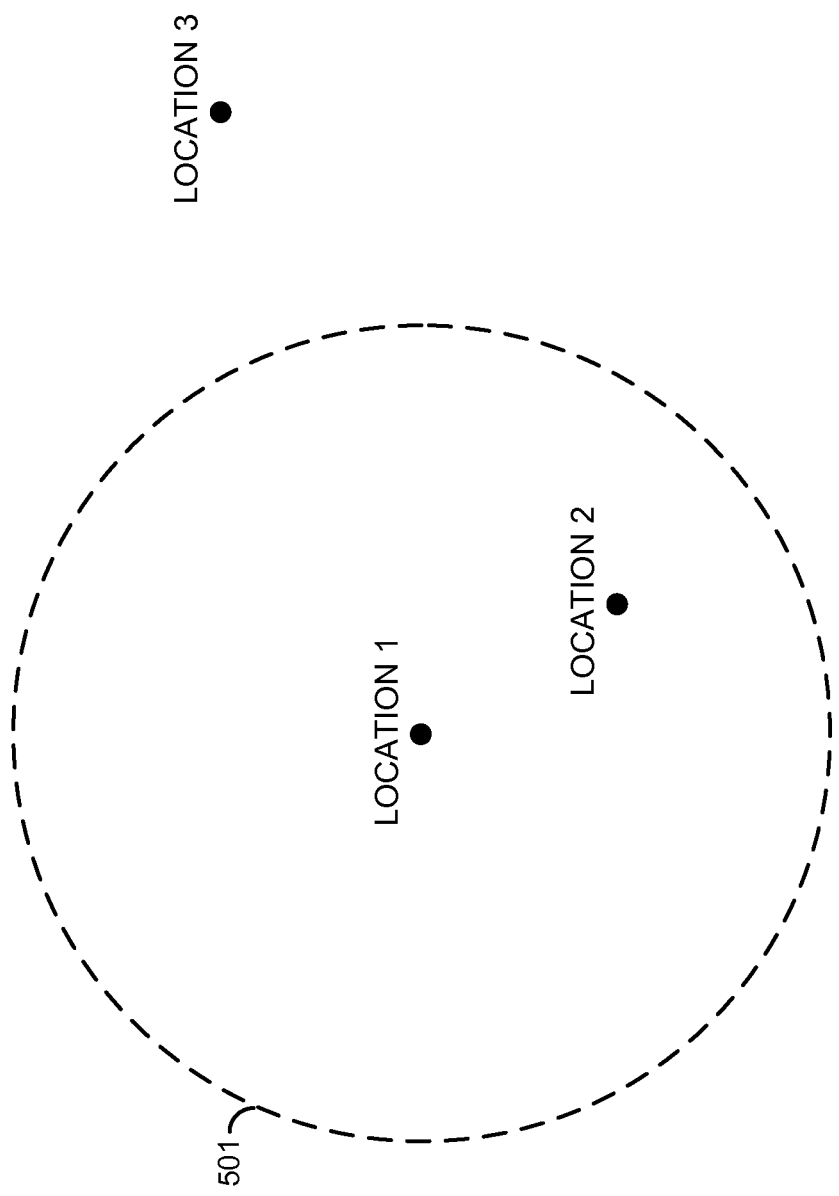
FIG. 5 illustrates wireless device locations used for extracting location signatures from data received from mobile devices on a wireless communication network.

Using Location 1, LSES 305 is able to determine geographic area 501 shown in FIG. 5 encircling Location 1. LSES 305 determines geographic area 501 by determining how far wireless device 301 would realistically be able to move from Location 1 within a certain period of time from when LSES 305 intercepted the location information indicating Location 1. For example, geographic area 501 may be all points within 100 miles of Location 1 because LSES 305 determines that wireless device 301 would only be able to travel 100 miles within an hour of receiving Location 1. While FIG. 5 shows geographic area 501 being a circular area, geographic area 501 may take any shape.

In some embodiments, Location 1 may not be an accurate location of wireless device 301 or may be a location that is less precise than geographic coordinates that are described in this example. In those embodiments LSES 305 may repeat steps 400-404 in order to determine more known locations of wireless device 301 that LSES 305 may use to more accurately create geographic area 501.

After determining geographic area 501, LSES 305 switches to a learning mode. When in learning mode, LSES 305 monitor for unknown location signatures. Learning mode will continue only as long as the time period used when determining geographic location 501 lasts, if not shorter. For example, if geographic area 501 accounts for a distance that wireless device 301 could travel in one hour, then LSES 305 will only operate in learning mode until a maximum of one hour has elapsed from the determination of Location 1.

Once in learning mode, LSES 305 begins receiving subsequent data from wireless device 301 (step 406). As before, LSES 305 receives the subsequent data by intercepting the data as it passes through CDMA network 304 en route to a destination and the subsequent data may include any type of data that an application executing on wireless device 301 may need to transfer as part of the functionality of the application.

The payloads of the packets that comprise the subsequent data are inspected by LSES 305 to determine whether the subsequent data contains location information that indicates a location within geographic area 501 (step 408). Thus, if the subsequent data contains location information, then LSES 305 determines whether the location indicated by the location information falls within geographic area 501 in order to help verify that the location information is for wireless device 301. If the subsequent data does not contain location information for wireless device 301, then LSES 305 repeats step 406 and 408 until LSES 305 is able to find location information that indicates a location within geographic area 501. Likewise, if the subsequent matches a known location signature, then LSES 305 repeats step 406 because the goal of the learning mode is to find unknown location signatures.

For example, the subsequent data contains location information that is generated by a second application executing on wireless device 301 and is destined for application server 308. LSES 305 then determines whether that location information indicates a location within geographic area 501. If the location information indicates Location 3, as shown in FIG. 5, then LSES 305 determines that Location 3 is not relevant because Location 3 falls outside of geographic area 501. Location 3 is not relevant because it is unlikely that wireless device 301 traveled outside of geographic area 501 during the time period allotted for LSES 305 to be in learning mode. Therefore, the location information that indicates Location 3 is most likely not location information for wireless device 301.

Alternatively, if the location information indicates Location 2, as shown in FIG. 5, then LSES 305 determines that Location 2 most likely is a location for wireless device 301 and continues with the learning mode process.

After determining that the location information indicates Location 2, LSES 305 determines a location signature for the location information that was sent from the second application executing on wireless device 301 (step 410). LSES 305 examines the subsequent data that carried the location information to determine a header, footer, pattern, or some other data arrangement that indicates that the subsequent data contains location information. This header, footer, pattern, or some other data arrangement is the location signature for the second application executing on wireless device 301 that transferred the location information. Once this new signature is determined, the signature can be compared to future communications transferred from wireless devices in order to detect location information being sent from the second application. Thus, the new location signature is stored in LSES 305 along with the other known location signatures (step 412).

After storing the new location signature, LSES 305 is now able to use this new signature as part of the known location signatures in step 400 when determining whether future data received from wireless device 301 contains a known location signature Likewise, LSES 305 can use the new location signature to detect known location signatures received from wireless devices 302 and 303.

LSES 305 is able to processes location signatures detected within data received from wireless devices 301-303 (step 414). While step 414 is shown in learning mode, it should be understood that step 414 could occur in scanning mode or be continually occurring regardless of mode. The processing may include monitoring which location signatures are used in order to maintain statistics of the location information that is transferred from applications executing on wireless devices 301-303.

Furthermore, the processing may include a filtering of location information transferred from wireless devices 301-303. The filtering may recognize a location signature for a particular application and prevent location information indicated by that signature from reaching a destination. Applications with location signatures that are filtered may be indicated on a device-by-device basis. For example, a user of wireless device 301 may indicate that a particular social networking application should not transfer location information. LSES 305 is notified of this indication and filters out any location information that is transferred from the social networking application based on detecting a location signature for that social networking application. In some cases, a location signature for an application may be universally known as undesired. Therefore, an operator of LSES 305 may indicate to LSES 305 that any location information with the location signature for the undesired application should be filtered regardless of which wireless device 301-303 transferred the information.

In some embodiments, a user of wireless devices 301-303 may be able to indicate a geographic area, such as around the home of the user, where the location of wireless devices 301-303 should not be sent. LSES 305 would then filter out location information that is transferred from the user's device when that user is in the designated geographic area. Additionally, a user may be able to indicate a precision of location information that the user desires to be transferred. For example, the user may want only the city where the user is located to be transferred. In that case, upon detecting a location signature from the device, LSES 305 will determine whether the location is more precise than the user desired and, if so, reduce the precision to the city where the device is located.

In some embodiments, after storing the new location signature, LSES 305 may return to step 406 in order to continue the learning mode to discover more new location signatures that were previously unknown to LSES 305. As stated above, learning mode may continue to loop in this manner until the time period used when determining geographic area 501 has elapsed.

Figure 6:
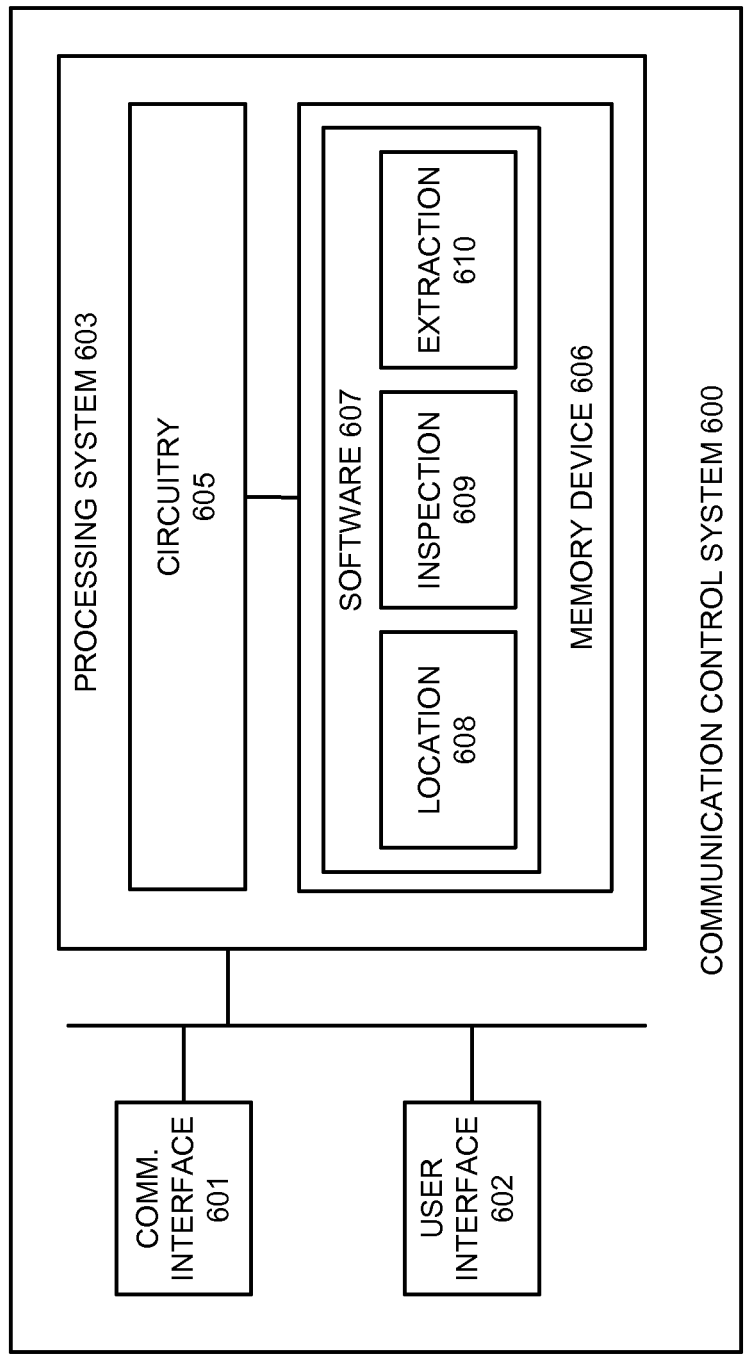
FIG. 6 illustrates a location signature extraction system for extracting location signatures from data received from mobile devices on a wireless communication network.

FIG. 6 illustrates communication control system 600. Communication control system 600 is an example of LSES 103 or 305, although LSES 103 and 305 may use alternative configurations. Communication control system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

Communication interface 601 is configured to, after determining a location of a wireless communication device, receive data generated by an application executing on the wireless communication device and transferred from the wireless communication device. Communication interface 601 is further configured to receive subsequent data from the wireless communication device and other wireless communication devices on the wireless communication network.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes location determination module 608, data inspection module 609, and location signature extraction module 610. Operating software 607 may further include an operating system, utilities, drivers, network interfaces, applications, or some other type of software. When executed by circuitry 605, operating software 607 directs processing system 603 to operate communication control system 600 as described herein.

In particular, location determination module 608 directs processing system 603 to determine a location of a wireless communication device. Data inspection module 609 directs processing system 603 to use the location to determine whether data contains location information for the wireless communication device. If the data contains location information, location signature extraction module 610 directs processing system 603 to determine a location signature for the application that indicates whether data from the application contains location information for the wireless communication device. Data inspection module further directs processing system 603 to determine whether subsequent data contains the location signature for the application.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a location signature extraction system in a wireless communication network comprising:
   upon determining a location of a wireless communication device, receiving data generated by an application executing on the wireless communication device;
   using the location to determine whether the data contains information pertaining to the location of the wireless communication device;
   if the data contains the information pertaining to the location of the wireless communication device, identifying a location signature specific to the application, wherein the location signature comprises an indicator that denotes the data contains location information; and
   using the location signature to determine whether subsequent data transferred from a plurality of wireless communication devices t contains information pertaining to a location of any of the plurality of wireless communication devices.

2. The method of claim 1 further comprising, storing the location signature along with a plurality of location signatures in the location signature extraction system.

3. The method of claim 2 further comprising:
   storing application information about the application to the storage medium along with the location signature.

4. The method of claim 1 further comprising:
   receiving first data transferred from the wireless communication device;
   determining whether the first data contains a first location signature of a plurality of location signatures in the location signature extraction system; and
   if the first data contains the first location signature, determining the location of the wireless communication device based on information contained in the first data.

5. The method of claim 1 wherein the location signature comprises a format for how location information is contained within the data.

6. The method of claim 1 wherein the location signature comprises a marker within the data that indicates that the data contains the location information.

7. The method of claim 1 wherein using the location to determine whether the data contains the information pertaining to the location of the wireless communication device comprises:
   determining a geographic area that includes the location; and
   determining whether the information pertaining to the location of the wireless communication device indicates a second location for the wireless communication device that is located within the geographic area.

8. The method of claim 1 further comprising:
   filtering undesired location information from the subsequent data based on identifying an undesired location signature within the subsequent data.

9. The method of claim 1 wherein the plurality of wireless communication devices includes the wireless communication device.

10. The method of claim 1 wherein the location information comprises global positioning coordinates.

11. A location signature extraction system in a wireless communication network comprising:
    a communication interface configured to, upon determining a location of a wireless communication device, receive data generated by an application executing on the wireless communication device;
    a processing system configured to use the location to determine whether the data contains information pertaining to the location of the wireless communication device, if the data contains the information pertaining to the location of the wireless communication device, identify a location signature specific to the application wherein the location signature comprises an indicator that denotes the data contains location information, and use the location signature to determine whether subsequent data transferred from a plurality of wireless communication devices contains information pertaining to a location of any of the plurality of wireless communication devices.

12. The system of claim 11 further comprising:
a storage system configured to store the location signature along with a plurality of location signatures.

13. The system of claim 12 further comprising:
the storage system further configured to store application information about the application along with the location signature.

14. The system of claim 11 further comprising:
the communication interface configured to receive first data transferred from the wireless communication device;
the processing system configured to determine whether the first data contains a first location signature of a plurality of location signatures in the location signature extraction system and, if the first data packet contains the first location signature, determining the location for the wireless device based on information contained in the first data.

15. The system of claim 11 wherein the location signature comprises a format for how the location information is contained within the data.

16. The system of claim 11 wherein the location signature comprises a marker within the data that indicates that the data contains the location information.

17. The system of claim 11 further comprising:
the processing system configured to use the location to determine whether the data contains the information pertaining to the location of the wireless communication device by determining a geographic area that includes the location and determining whether the information pertaining to the location of the wireless communication device indicates a second location for the wireless communication device that is located within the geographic area.

18. The system of claim 17 further comprising:
the processing system configured to filter undesired location information from the subsequent data based on identifying an undesired location signature within the subsequent data.

19. The system of claim 11 wherein the plurality of wireless communication devices includes the wireless communication device.

20. A computer readable medium having instructions stored thereon that, when executed by a location signature extraction system, direct the location signature extraction system to:
upon determining a location of a wireless communication device, receive data generated by an application executing on the wireless communication device;
use the location to determine whether the data contains information pertaining to the location of the wireless communication device;
if the data contains the information pertaining to the location of the wireless communication device, identify a location signature specific to the application wherein the location signature comprises an indicator that denotes the data contains location information; and
use the location signature to determine whether subsequent data transferred from a plurality of wireless communication devices contains information pertaining to a location of any of the plurality of wireless communication devices.

\* \* \* \* \*